US009266557B2

(12) United States Patent
Matayoshi et al.

(10) Patent No.: US 9,266,557 B2
(45) Date of Patent: Feb. 23, 2016

(54) STEERING DEVICE FOR WHEEL

(71) Applicant: Nissan Motor Co., Ltd., Yokohama, Kanagawa (JP)

(72) Inventors: Yutaka Matayoshi, Yokosuka (JP); Kunihiko Morikawa, Hiratsuka (JP); Sakiko Suzuki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 18 days.

(21) Appl. No.: 14/357,578

(22) PCT Filed: Oct. 4, 2012

(86) PCT No.: PCT/JP2012/075804
§ 371 (c)(1),
(2) Date: May 12, 2014

(87) PCT Pub. No.: WO2013/073308
PCT Pub. Date: May 23, 2013

(65) Prior Publication Data
US 2014/0353054 A1 Dec. 4, 2014

(30) Foreign Application Priority Data

Nov. 16, 2011 (JP) .................................. 2011-250213

(51) Int. Cl.
*B60K 7/00* (2006.01)
*B62D 5/04* (2006.01)
(Continued)

(52) U.S. Cl.
CPC ................ *B62D 5/0421* (2013.01); *B60G 3/20* (2013.01); *B60G 13/005* (2013.01); *B60K 7/00* (2013.01); *B60K 7/0007* (2013.01); *B62D 3/02* (2013.01); *B62D 7/06* (2013.01); *B62D 7/08* (2013.01); *B62D 7/18* (2013.01); *B62D 9/00* (2013.01);*B60G 2200/144* (2013.01); *B60G 2204/129* (2013.01); *B60G 2206/50* (2013.01); *B60G 2300/50* (2013.01); *B60K 17/043* (2013.01); *B60K 2007/0038* (2013.01); *B60K 2007/0092* (2013.01)

(58) Field of Classification Search
None
See application file for complete search history.

(56) References Cited

U.S. PATENT DOCUMENTS 7,097,184 B2 * 8/2006 Kapaan et al. ............ 280/93.512
7,204,341 B2 * 4/2007 Lundmark .................... 180/402
(Continued)

FOREIGN PATENT DOCUMENTS

| CN | 1703335 A | 11/2005 |
|---|---|---|
| CN | 201484168 U | 5/2010 |

(Continued)

OTHER PUBLICATIONS

The Extended European Search Report for the corresponding European patent application No. 12850703.5 issued on Feb. 26, 2015.

*Primary Examiner* — John Walters
*Assistant Examiner* — Hilary L Johns
(74) *Attorney, Agent, or Firm* — Global IP Counselors, LLP

(57) ABSTRACT

A steering device basically includes an in-wheel motor drive wheel, a dedicated in-wheel motor drive unit, an upper side fixing seat, a lower side fixing seat and a steering mechanism. The dedicated in-wheel motor drive unit includes an electric motor as a power source. The dedicated in-wheel motor drive unit is integrated with the in-wheel motor drive wheel. The upper side fixing seat is disposed at an upper part of the dedicated in-wheel motor drive unit. The lower side fixing seat is disposed at a lower part of the dedicated in-wheel motor drive unit. The steering mechanism converts a steering force to a steering torque around a king pin axis and applies a torque to the in-wheel motor drive wheel. The steering mechanism is disposed in a location that is on the king pin axis and that is above the in-wheel motor drive wheel.

20 Claims, 7 Drawing Sheets

(51) Int. Cl.
  *B60G 3/20* (2006.01)
  *B60G 13/00* (2006.01)
  *B62D 3/02* (2006.01)
  *B62D 7/06* (2006.01)
  *B62D 7/08* (2006.01)
  *B62D 7/18* (2006.01)
  *B62D 9/00* (2006.01)
  *B60K 17/04* (2006.01)

(56) References Cited

U.S. PATENT DOCUMENTS

| | | | |
|---|---|---|---|
| 8,453,774 B2* | 6/2013 | Nagaya | 180/65.51 |
| 2006/0027986 A1* | 2/2006 | Ziech | 280/93.512 |
| 2013/0284526 A1* | 10/2013 | Kawasaki et al. | 180/55 |
| 2014/0000970 A1* | 1/2014 | Munster et al. | 180/55 |
| 2014/0020966 A1* | 1/2014 | Lee | 180/55 |

FOREIGN PATENT DOCUMENTS

| | | |
|---|---|---|
| CN | 201670260 U | 12/2010 |
| EP | 0334691 A1 | 9/1989 |
| EP | 1057714 | 12/2000 |
| EP | 1757469 A1 | 2/2007 |
| JP | 5-124535 A | 5/1993 |
| JP | 6-183365 A | 7/1994 |
| JP | 6-235443 A | 8/1994 |
| JP | 2006-062388 A | 3/2006 |
| JP | 2009-90921 A | 4/2009 |
| JP | 2010-58681 A | 3/2010 |
| WO | 2006/030532 A1 | 3/2006 |

* cited by examiner $$\frac{W}{L} = \cot\beta - \cot\alpha$$

STEERING DEVICE FOR WHEEL

CROSS-REFERENCE TO RELATED APPLICATIONS

This application is a U.S. National stage application of International Application No. PCT/JP2012/075804, filed Oct. 4, 2012, which claims priority to Japanese Patent Application No. 2011-250213 filed in Japan on Nov. 16, 2011, the contents of which are hereby incorporated herein by reference.

BACKGROUND

1. Field of the Invention

The present invention relates to a steering device for wheels for steering the wheel around a king pin axis and especially relates to a proposal for an improvement that will facilitate a large turn of the wheel at a large angle like, for example, 90 degrees.

2. Background Information

A conventional example of a generally known steering mechanism that facilitates making a large turn of the wheel in this way includes that which is disclosed in Japanese Laid-Open Patent Publication No. 2006-062388. The steering device disclosed in this Japanese Patent Publication comprises a dedicated in-wheel drive unit that is built-in and has an electric motor as the power source, and this device is a steering device for in-wheel motor drive wheels that are each driven by this dedicated in-wheel motor drive unit; a tie rod is coupled to a knuckle arm of these wheels, and the steering force from the steering wheel is converted to the steering force around the king pin axis of the wheel via the tie rod and knuckle arm in order to steer the in-wheel motor drive wheels.

SUMMARY

In such a steering device for in-wheel motor drive wheels and on the inner side of the wheel in the vehicle width direction exist the tie rod as well as a lower arm, which is a suspension arm on the lower side; while making a large turn, the wheel interfere with the tie rod and lower arm.

Therefore, when setting the maximum steering angle of the in-wheel motor drive wheels, the setting has to be adjusted so as to be able to avoid the movement ranges of the tie rod and lower arm and so that the maximum steering angle of the wheel is restricted by the existence of the tie rod and the lower arm.

For this reason, when the steering device is used, for example, in an in-wheel motor drive-type electric vehicle, conducting what is characteristic of this in-wheel motor drive-type electric vehicle is difficult, such as making a large turn for lateral driving, etc., by, for example, making a 90-degree turn of the in-wheel motor drive wheels. Therefore, there was a problem in that one of the characteristics of the in-wheel motor drive-type electric vehicles would be spoiled.

The present invention, which is not limited to in-wheel motor drive wheels, is a steering device that can also be applied to general wheels. In any case, in light of the problem mentioned above, this invention aims to solve the above-described problem by providing a steering device for wheels in which other parts, such as a tire rod or a lower arm, that configure the wheel steering system will not exist on the inner side of the wheel in the vehicle width direction, thereby facilitating large turns for lateral driving by making a 90-degree turn of the wheel, etc.

For this purpose, a steering device is provided that basically includes an in-wheel motor drive wheel, a dedicated in-wheel motor drive unit, an upper side fixing seat, a lower side fixing seat and a steering mechanism. The dedicated in-wheel motor drive unit includes an electric motor as a power source. The dedicated in-wheel motor drive unit is integrated with the in-wheel motor drive wheel. The upper side fixing seat is disposed at an upper part of the dedicated in-wheel motor drive unit. The lower side fixing seat is disposed at a lower part of the dedicated in-wheel motor drive unit. The steering mechanism converts a steering force to a steering torque around a king pin axis and applies a torque to the in-wheel motor drive wheel. The steering mechanism is disposed in a location that is on the king pin axis and that is above the in-wheel motor drive wheel In such a steering device for wheels according to the present invention, since the steering mechanism is disposed in a location that is on the king pin axis and above the in-wheel motor drive wheels, the other parts that configure the wheel steering system do not have to be present on the inner side of the wheel in the vehicle width direction, facilitating large turns for lateral driving by making a 90-degree turn of the wheel, etc., and, therefore, creating the possibility of realizing a vehicle that requires such large turns of the wheel. Additionally, since the upper side fixing seat and the lower side fixing seat of the in-wheel motor drive unit are each attached to the upper and lower suspension arms to make the wheel steerable around the king pin axis, the coupling parts of the upper and lower suspension arms are mutually separated in the up and down direction by the distance between the upper side fixing seat and the lower side fixing seat. In this way, the above-described effect can be exerted without accompanying the lack in attachment strength of the in-wheel motor drive unit.

BRIEF DESCRIPTION OF THE DRAWINGS

Referring now to the attached drawings which form a part of this original disclosure.

DETAILED DESCRIPTION OF THE EMBODIMENTS

Embodiments of the present invention will be described below based on the attached drawings.

Embodiment 1

Figure 1:
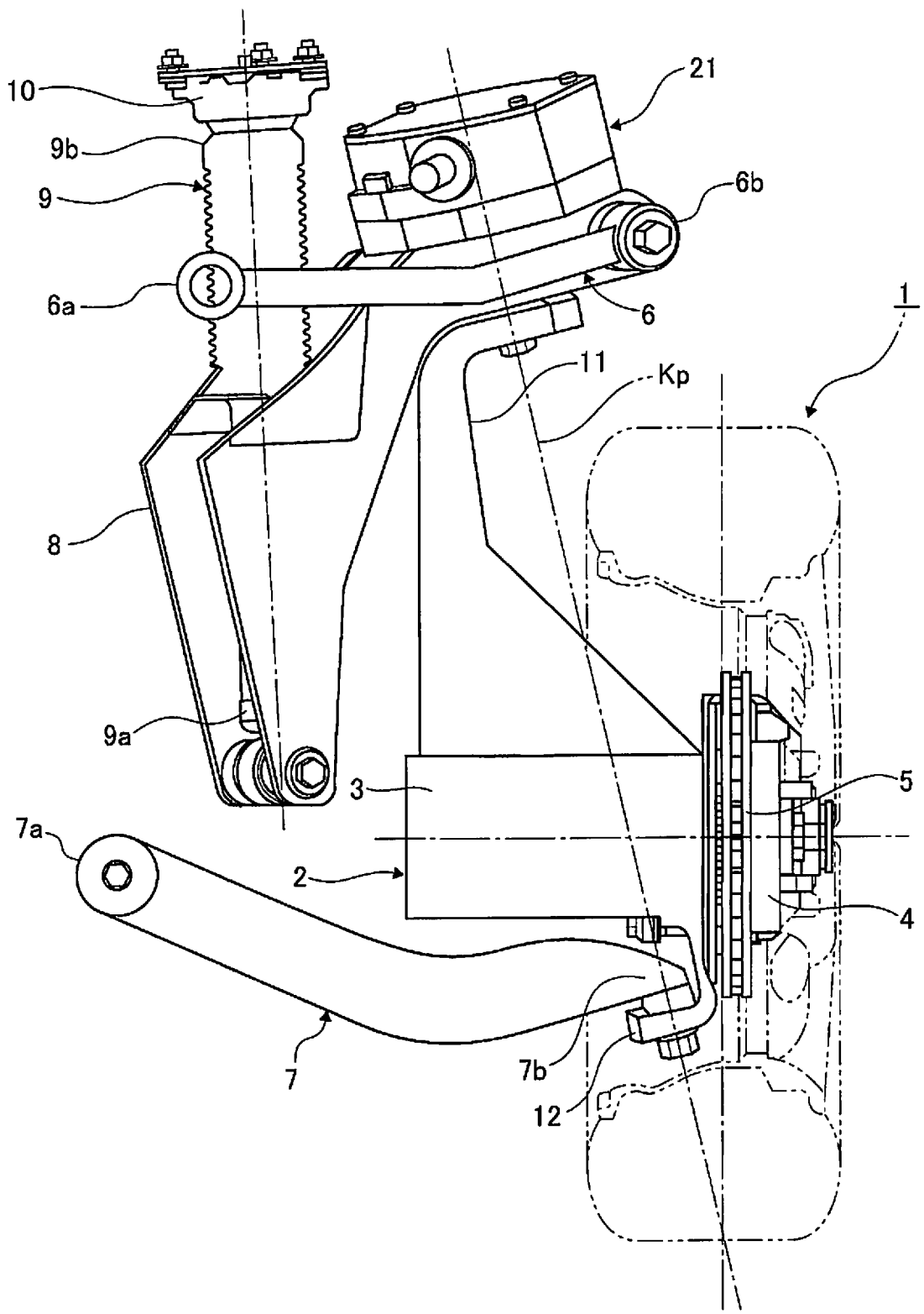
FIG. 1 is a frontal view of in-wheel motor drive wheels comprising a steering device of a first example of the present invention, as seen from the rear of the vehicle, along with the suspension device and the steering system.
Figure 2:
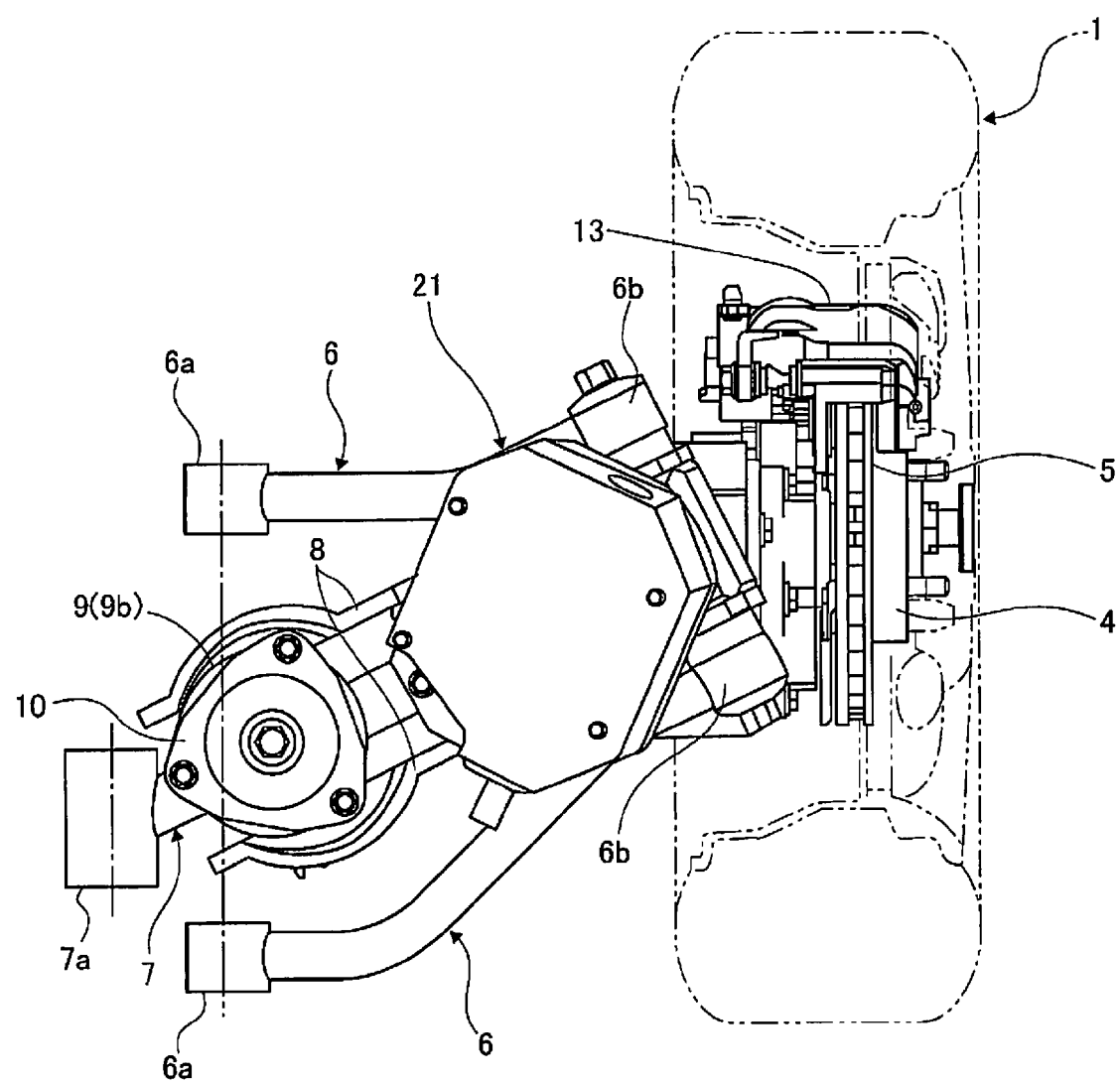
FIG. 2 is a plan view of the in-wheel motor drive wheels comprising the steering device in FIG. 1, as seen from above the vehicle.

FIGS. 1 and 2 show wheel 1 comprising a steering device of a first example of the present invention, along with the suspension device and the steering system; FIG. 1 is a frontal view of the wheel 1, as seen from the rear of the vehicle, and FIG. 2 is a plan view of the wheel 1, as seen from above the vehicle.

Meanwhile, the wheel 1 of the present example integrally comprise each of the in-wheel motor drive units 2 and is configured to be in-wheel motor drive wheel, which are each driven by these units 2. However, the wheel 1 does not have to be drive wheels; even if it is a drive wheel, they are not limited to in-wheel motor drive wheel and can be a drive wheel in a type of vehicle that drives a plurality of wheels with a common power source.

As in the diagrammed example, in the case that the wheel 1 is in-wheel motor drive wheel, the in-wheel motor drive unit 2 that is in charge of driving the wheel has an electric motor and a reduction gear (a transmission) built into the unit case 3, though they are not diagrammed in FIGS. 1 and 2; the electric motor is coupled to the input shaft of the reduction gear, and a wheel hub 4 is coupled to the output shaft of the reduction gear.

The wheel 1 is coupled to the wheel hub 4, as well as to the brake disc 5, and with this, the power from the electric motor is transmitted to the wheel 1 under reduction by the reducing gear, which allows the vehicle to drive; by pressing the brake disc 5 from both sides with a brake caliper 13 (refer to FIG. 2), which is attached to the in-wheel motor drive unit 2, the vehicle can be braked from both sides in the axial direction.

When suspending the wheel 1 to the vehicle body, the wheel 1 is suspended via a case 4 of the in-wheel motor drive unit 2 with the suspension device mentioned below. The suspension device, as clearly shown in FIG. 1, is generally includes an upper arm 6, which is an upper side suspension arm that extends in the vehicle width direction above the unit case 4; a lower arm 7, which is a lower side suspension arm that extends in the vehicle width direction below the unit case 4; a third link 8; and a shock absorber 9 (including a suspension spring).

The upper arm 6 and the lower arm 7 are each supported in a swingable manner in the up and down direction with respect to the vehicle at the base ends 6a and 7a of the left side (the inner side in the vehicle width direction) in FIG. 1. The free end 6b on the opposite side of the upper arm 6 (the outer side in the vehicle width direction) is pivoted in a swingable manner in the up and down direction at the upper end of the third link 8; the lower end of the third link 8 is pivoted in a swingable manner to a piston rod 9a of the shock absorber 9. Meanwhile, the shock absorber 9 attaches a cylinder 9b to the vehicle body via an insulator 10.

Then, an upper side fixing seat 11 that extends upward from the upper side surface is installed in a protruding manner, and a lower side fixing seat 12 that extends downward from the lower side surface is installed in a protruding manner on the in-wheel motor drive unit case 4. The upper end of the upper side fixing seat 11 is attached in a pivotal manner around a king pin axis Kp, which is the steering axis of the wheel 1, adjacent the upper end of the third link 8; the lower end of the lower side fixing seat 12 is attached in a pivotal manner around the king pin axis Kp at the free end 7b on the outer side in the vehicle width direction of the lower arm 7.

The wheel 1 that is suspended to the vehicle body by the suspension device described above can bound and rebound in the up and down direction, along with the in-wheel motor drive unit 2; additionally, the up and down vibrations can be attenuated by the shock absorber 9 that lies in between. The wheel 1 and the in-wheel motor drive unit 2 can also be steered around the king pin axis Kp and can steer the vehicle.

Steering Device

Figure 3:
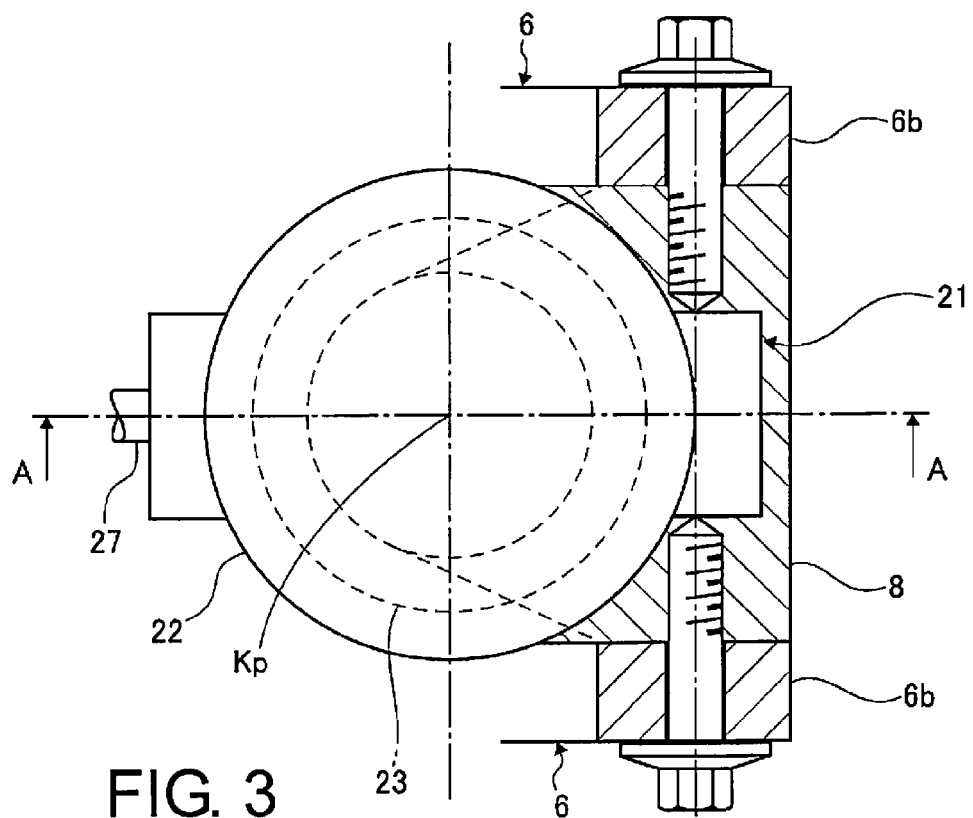
FIG. 3 is an enlarged plan view of the steering device in FIG. 1, as seen from above the vehicle.
Figure 4:
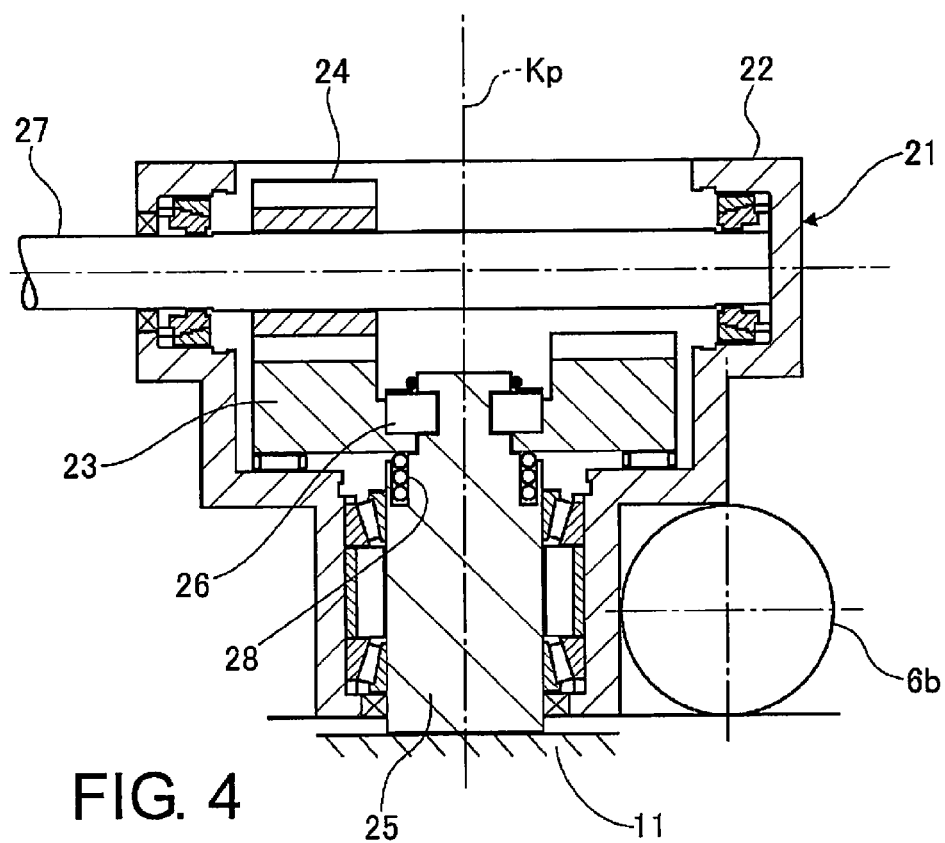
FIG. 4 is an enlarged cross-sectional side view of the steering device, with the cross section along the A-A line in FIG. 3, and as seen in the direction of the arrow.

The steering mechanism 21 for steering the wheel 1 and the in-wheel motor drive unit 2 around the king pin axis (Kp) is installed by being attached to the third link 8, as shown in FIGS. 1 and 2; this mechanism is disposed on the king pin axis Kp and in a location that is above the in-wheel motor drive wheel 1. This steering mechanism 21 is configured as clearly shown in FIGS. 3 and 4. FIG. 3 is a plan view of the steering mechanism 21, as seen from above. FIG. 4 is a detailed sectional view of a cross section at the A-A line in FIG. 3, as seen in the direction of the arrow.

To describe the steering mechanism 21 in detail, based on FIGS. 3 and 4, 22 represents the chassis; an annular ring-shaped face gear 23 and a pinion gear 24 that engages with this are housed in this chassis 22. The face gear 23 engages in a displaceable manner in the axial direction with a steering shaft 25 that protrudes from the upper end of the upper side fixing seat 11 so as to provide the king pin axis Kp, as shown in FIG. 4, with a key 26 (or a spline) and is made to be rotatable around the king pin axis Kp along with this steering shaft 25.

The pinion gear 24 is integrally and rotatably fixed on the input shaft 27, which is laterally bridged rotatably in the chassis 22 so as to cross the king pin axis Kp; the fixing position shall be the position where the pinion gear 24 meshes with the face gear 23. While not diagrammed, the input shaft 27 is mechanically coupled with the steering wheel that is operated by the driver upon operating the vehicle. Thus, the steering force from the steering wheel reaches from the input shaft 27 to the steering shaft 25 via the pinion gear 24 and an annular ring-shaped face gear 23, and this force can steer the in-wheel motor drive unit 2 and the wheel 1 around the king pin axis Kp via the upper side fixing seat 11.

The face gear 23, which is engaged in a displaceable manner with a steering shaft 25 in the axial direction with the key 26, is biased toward the pinion gear 24 by a coil spring 28 that is wound to the steering shaft 25; with this, the backlash at the meshing section of the face gear 23 and the pinion gear 24 is reduced. Therefore, the coil spring 28 configures the elastic means of the present invention.

Effects

According to the steering device of the present example comprising the above-described steering mechanism 21, since the steering mechanism 21 is disposed in a position that is on the king pin axis Kp and above the in-wheel motor drive wheel 1, the other parts of the wheel steering system, including parts between the input shaft 27 of the steering mechanism 21 and the steering wheel, no longer need to be present on the inner side of the in-wheel motor drive wheel 1 in the vehicle width direction, facilitating large turns for lateral driving by making a 90-degree turn of the wheel, etc. Therefore, the benefits of large wheel turning, which is one of the characteristics of in-wheel motor drive-type electric vehicles, will not be impaired.

Meanwhile, according to conventional general thought, in the case of steering the wheel with a steering mechanism, coupling the output member of the steering mechanism to the knuckle of the wheel was normal; for this reason, satisfying the driving of the vehicle while enacting the steering geometry as demanded was difficult. However, in the present example, the steering mechanism 21 is disposed on the king pin axis Kp in a position that is above the wheel 1 and is attached on the third link 8, which is one of the suspension members; therefore, satisfying the driving of the vehicle while enacting the steering geometry as demanded is easy.

Additionally, since the face gear 23 was biased toward the pinion gear 24 by the coil spring 28 in order to reduce the backlash between the two, problems such as the steering mechanism 21 generating noise or generating an engagement error can be avoided.

Embodiment 2

Figure 5:
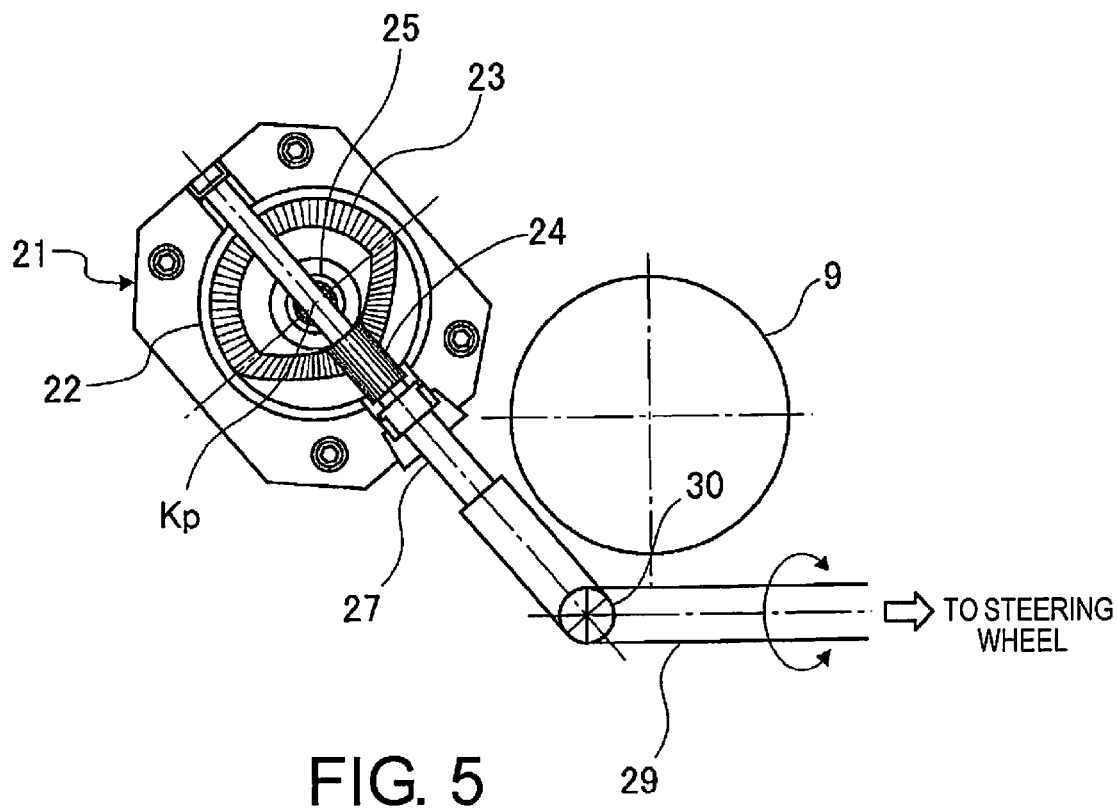
FIG. 5 is a plan view of a steering device of a second example of the present invention, as seen from above the vehicle.

FIG. 5 is a plan view of a steering mechanism 2 of a second example of the present invention, as seen from above the vehicle. In the present example, the face gear 23 of the steering mechanism 21 is configured not by a constant velocity face gear, as shown in FIGS. 3 and 4, but by a non-constant velocity face gear.

Besides that, the gear was made to have the same configuration as that described above for FIG. 1 to FIG. 4, including the suspension device; with the steering force from the steering wheel being transmitted to the input shaft 27 of the steering mechanism 21 via the left and right steering mechanism connecting shafts 29 and the constant velocity universal joint 30, the gear functions in the same way as in the first example and exerts the same effect.

Effects

The other effects of the steering device of the present example, as shown in FIG. 5, are described below, based on FIGS. 6 and 7.

Figure 6:
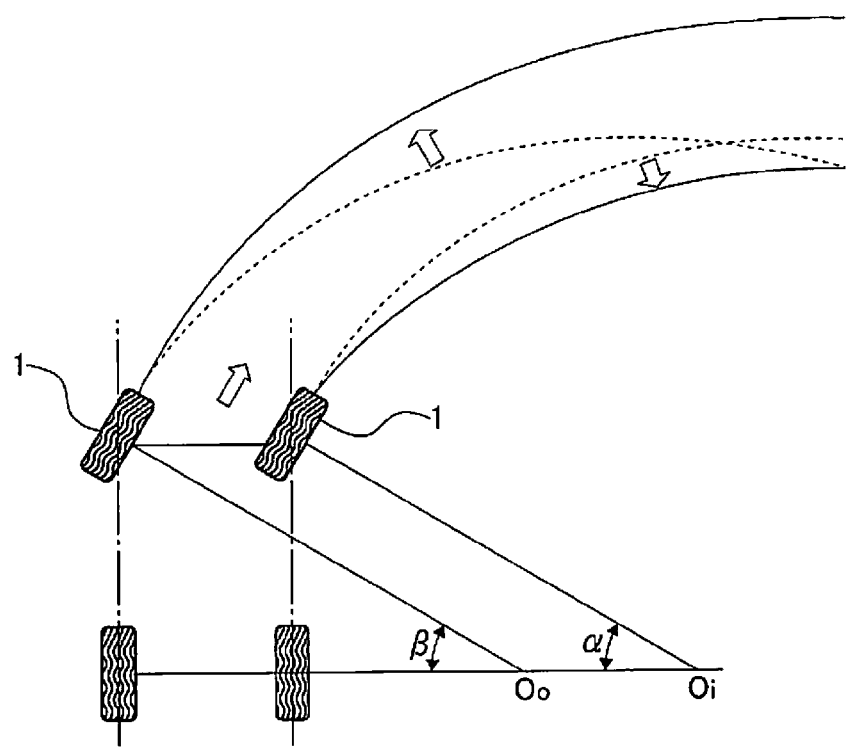
FIG. 6 is an explanatory diagram showing a turning locus of the in-wheel motor drive wheels according to the steering device of the first example shown in FIGS. 1 to 4.

When the face gear 23 of the steering device 21 is configured by a constant velocity face gear such as that shown in FIGS. 3 and 4, since both the inner and outer wheels in the turning direction will be steered by the same steering angle $\alpha = \beta$ when steering the in-wheel motor drive wheel 1, as shown in FIG. 6, the center of turning of the inner and outer wheels in the turning direction will be different, such as 0i and 0o. For this reason, especially when making large turns, the in-wheel motor drive wheel 1 slips significantly between them and the road surface, generating tire wear and noise, due to friction.

Figure 7:
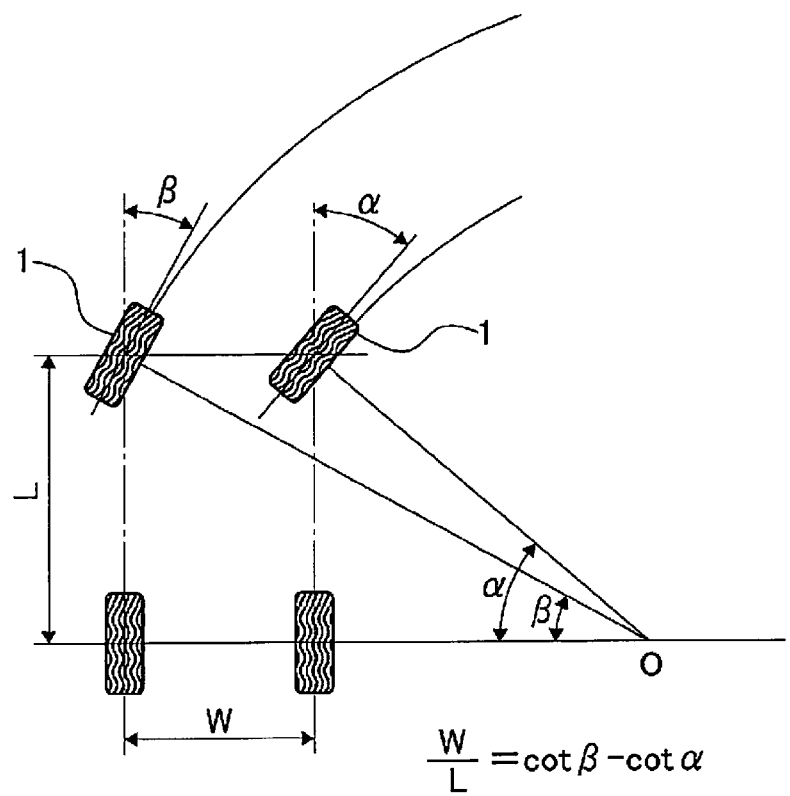
FIG. 7 is an explanatory diagram showing a turning locus of the in-wheel motor drive wheels according to the steering device of the second example shown in FIG. 5.

However, in the present example, since the face gear 23 of the steering mechanism 21 is configured by a non-constant velocity face gear, as shown in FIG. 5, with an appropriate design of the non-constant velocity face gear, when steering the in-wheel motor drive wheel 1, as shown in FIG. 7, the turning angles $\alpha$ and $\beta$ of the inner and outer wheels in the turning direction can be made different so that the center of turning of the inner and outer wheels in the turning direction will become the same O. For this reason, in the present example, the in-wheel motor drive wheel 1 will not slip between them and the road surface even when making large turns, so that the generation of tire wear and noise due to friction can be prevented.

Meanwhile, the steering angles $\alpha$ and $\beta$ of the inner and outer wheels in the turning direction that will make the center of turning of the inner and outer wheels in the turning direction be the same O during the steering of the in-wheel motor drive wheel 1, as shown in FIG. 7 are steering angles that satisfy the following formula, when the front and rear wheel axis distance (the wheelbase) is L and the left and right wheel interval (the tread) is W.

$$W/L = \cot \beta - \cot \alpha$$

Therefore, in the present example, the fact that the non-constant velocity face gear 23 of the steering mechanism 21 pertaining to the left and right in-wheel motor drive wheel 1 is designed so that the turning angles $\alpha$ and $\beta$ of the inner and outer wheels in the turning direction determined by using the above formula with the wheelbase L and the tread W can be obtained goes without saying.

Embodiment 3

Figure 8:
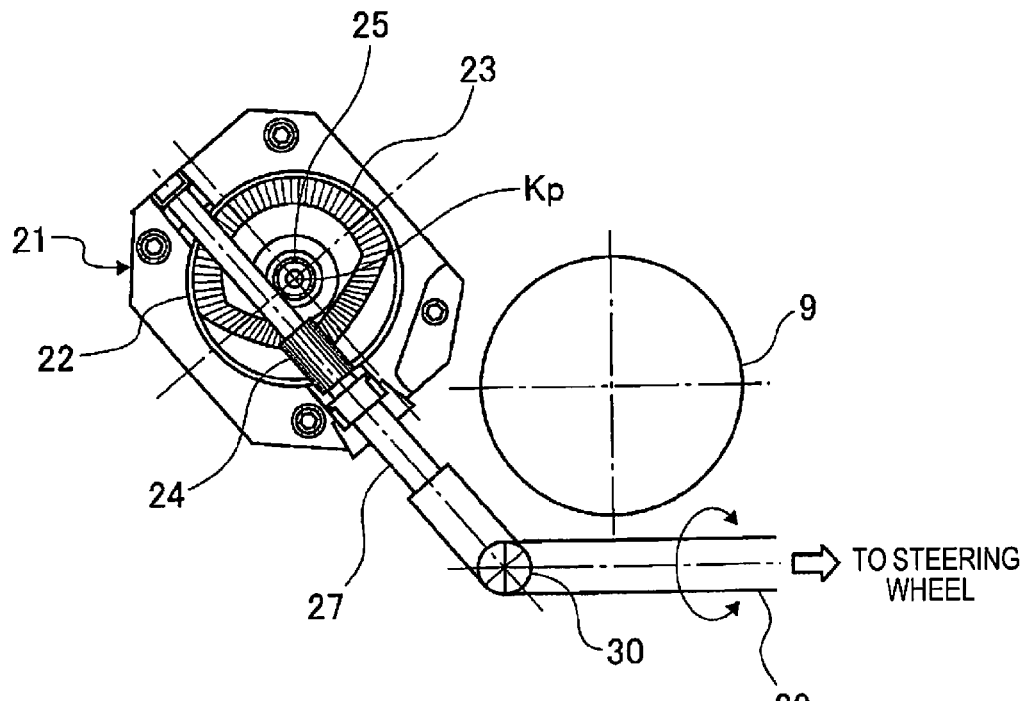
FIG. 8 is a plan view of a steering device of a third example of the present invention, as seen from above the vehicle.

FIG. 8 is a plan view of the steering mechanism 21 of the steering device of the third example of the present invention, as seen from above the vehicle, in the same way as in FIG. 5; in the present example, the face gear 23 of the steering mechanism 21 is configured by the same non-constant velocity face gear as in the second example mentioned above regarding FIG. 5, in addition to the central axis of the pinion gear 24; therefore, the input shaft 27 of the steering mechanism 21 is offset in a direction away from the shock absorber 9 with respect to the king pin axis Kp, which is the rotational axis of the non-constant velocity face gear 23.

Besides that, the configuration is the same as that described above for FIG. 1 to FIG. 4, including the suspension device; with the steering force from the steering wheel being transmitted to the input shaft 27 of the steering mechanism 21 via the left and right steering mechanism connecting shafts 29 and the constant velocity universal joint 30, the functions are the same as in the first and second examples, and the same effect as these examples is exerted.

Effects

In the steering device according to the present example shown in FIG. 8, besides the effects of the first and second examples, the following effect can also be exerted. That is, since the input shaft 27 (the central axis of the pinion gear 24) of the steering mechanism 21 was offset from the rotational axis of the non-constant velocity face gear 23 (the king pin axis Kp), not to mention the input shaft 27 of the steering mechanism 21 and the left and right steering mechanism connecting shafts 29 that are connected in a drivable manner to this via the constant velocity universal joint 30, and are distanced from the shock absorber 9, thereby increasing the degree of freedom in the design regarding the layout of these parts.

Embodiment 4

Figure 9:
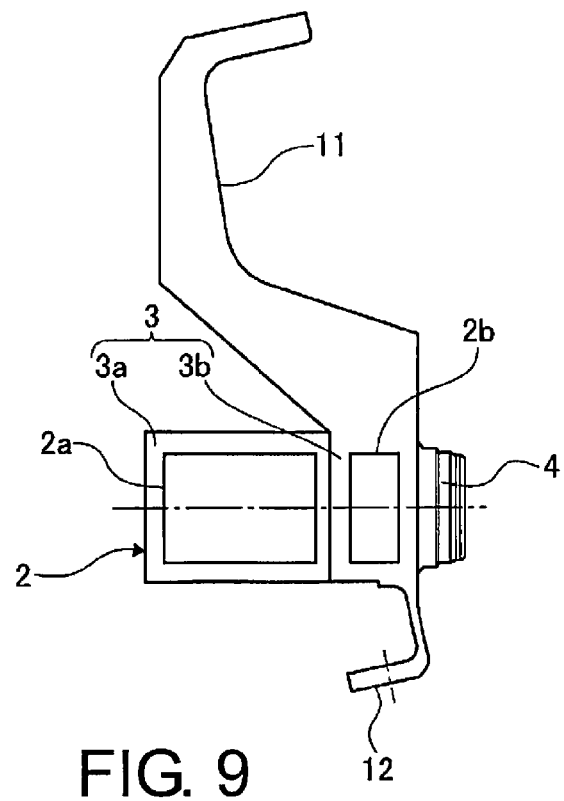
FIG. 9 is a frontal view of an in-wheel motor drive unit and the upper and lower fixing seats of a steering device of a fourth example of the present invention, as seen from the same direction as FIG. 1.

FIG. 9 is a frontal view of an in-wheel motor drive unit 2 in the steering device of the fourth example of the present invention, as seen from the same direction as FIG. 1. In the present example, the in-wheel motor drive unit 2 also has built into the unit case 3 an electric motor 2a and a reduction gear (a transmission) 2b on the same axis, though they are not diagrammed in FIGS. 1 and 2; the electric motor 2a is coupled to the input shaft of the reduction gear 2b, and a wheel hub 4 is coupled to the output shaft of the reduction gear 2b.

The unit is also the same as in the first example in that the upper side fixing seat 11 at the upper part and the lower side fixing seat 12 at the lower part of the in-wheel motor drive unit 2 are each attached to the upper arm 6 (refer to FIGS. 1 and 2) and the lower arm 7 (refer to FIGS. 1 and 2); the in-wheel motor drive unit 2 is made to be steerable around the king pin axis Kp along with the wheel 1.

Meanwhile, in the present example, the case 3 of the in-wheel motor drive unit 2 is divided in the axial direction at the location of the reduction gear 2b; of these divided case parts 3a and 3b, the upper side fixing seat 11 and the lower side fixing seat 12 are each integrally installed on the case part 3b, which is the one closer to the wheel 1.

Effects

In the steering device according to the present example shown in FIG. 9, besides the effects of the first, second, and third examples, the following effect can also be exerted. That is, of the above-described divided case parts 3a and 3b of the in-wheel motor drive unit case 3, the upper side fixing seat 11 and the lower side fixing seat 12 are each integrally installed on the wheel side case part 3b, so that the heavy members such as the reduction gear 6b, the upper side fixing seat 11, and the lower side fixing seat 12, are positioned near the wheel hub 4; thus, the pressure resistance of the hub bearing can be improved.

Embodiment 5

Figure 10:
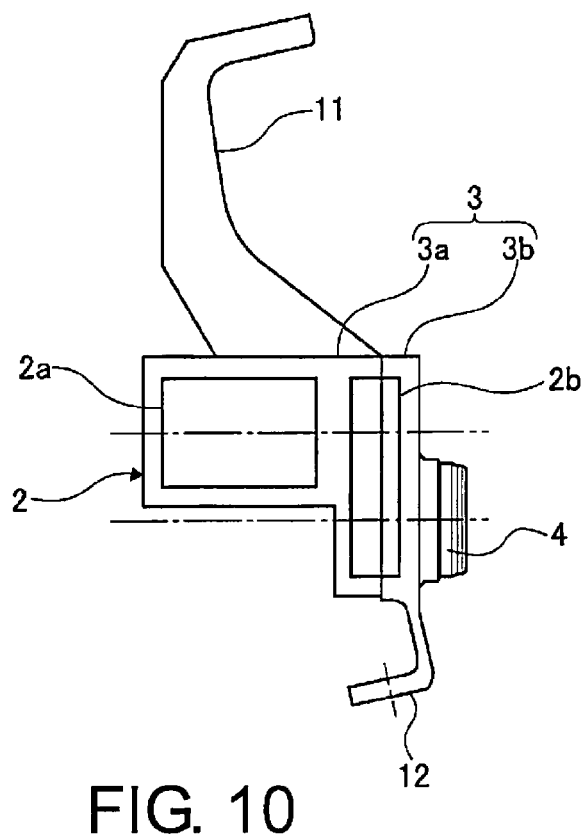
FIG. 10 is a frontal view of an in-wheel motor drive unit and the upper and lower fixing seats of a steering device of a fifth example of the present invention, as seen from the same direction as FIG. 1.

FIG. 10 is a frontal view of an in-wheel motor drive unit 2 in the steering device of the fifth example of the present invention, as seen from the same direction as FIG. 1. In the present example, while the electric motor 2a and the reduction gear (a transmission) 2b are built into the case 3 of the in-wheel motor drive unit 2, the output shaft of the reduction gear 2b (the transmission) that couples the wheel hub 4 is offset from the electric motor 2a.

Meanwhile, the configuration is the same as in the first example in that the upper side fixing seat 11 at the upper part and the lower side fixing seat 12 at the lower part of the in-wheel motor drive unit 2 are each attached to the upper arm 6 (refer to FIGS. 1 and 2) and the lower arm 7 (refer to FIGS. 1 and 2); additionally, the in-wheel motor drive unit 2 is made to be steerable around the king pin axis Kp along with the wheel 1.

Meanwhile, in the present example, the case 3 of the in-wheel motor drive unit 2 is divided in the axial direction at the location of the reduction gear 2b; of these divided case parts 3a and 3b, the upper side fixing seat 11 is integrally installed on the case part 3a, which is the one farther from the wheel 1, and the lower side fixing seat 12 is integrally installed on the case part 3b, which is the one closer to the wheel 1.

In the steering device according to the present example shown in FIG. 10, besides the effects of the first, second, and third examples, the following effect can also be exerted. That is, of the above-described divided case parts 3a and 3b of the in-wheel motor drive unit case 3, the upper side fixing seat 11 is integrally installed on the vehicle side case part 3a, and the lower side fixing seat 12 is integrally installed on the wheel side case part 3b; therefore, when the output shaft of the reduction gear (the transmission) 2b is offset from the electric motor 2a, the offset amount between the two can be made to be large, so that, even if the up and down movement of the wheel 1 becomes large, the interference of the lower arm 7 (refer to FIGS. 1 and 2) can be prevented.

Embodiment 6

Figure 11:
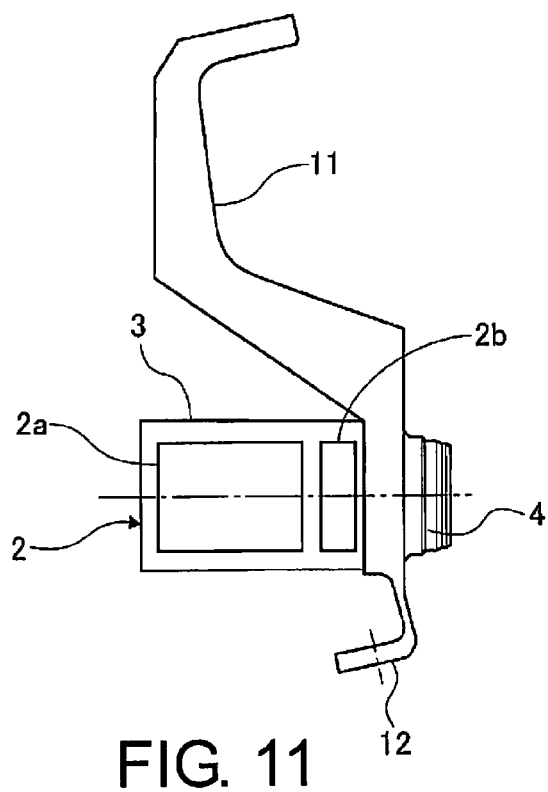
FIG. 11 is a frontal view of an in-wheel motor drive unit and the upper and lower fixing seats of a steering device of a sixth example of the present invention, as seen from the same direction as FIG. 1.

FIG. 11 is a frontal view of an in-wheel motor drive unit 2 in the steering device of the sixth example of the present invention, as seen from the same direction as FIG. 1. In the present example, as with the first example, the electric motor 2a and the reduction gear (the transmission) 2b are coaxially installed in the case 3 of the in-wheel motor drive unit 2; the upper side fixing seat 11 at the upper part and the lower side fixing seat 12 at the lower part of the in-wheel motor drive unit 2 are each attached to the upper arm 6 (refer to FIGS. 1 and 2) and the lower arm 7 (refer to FIGS. 1 and 2), and the in-wheel motor drive unit 2 is made to be steerable around the king pin axis Kp along with the wheel 1.

Meanwhile, in the present example, the upper side fixing seat 11 and the lower side fixing seat 12 are integrally configured, and the case 3 of the in-wheel motor drive unit 2 is attached to the integrated upper side fixing seat 11 and the lower side fixing seat 12.

Effects

In the steering device according to the present example shown in FIG. 11, besides the effects of the first, second, and third examples, the following effect can also be exerted. That is, since the upper side fixing seat 11 and the lower side fixing seat 12 are integrally configured, and since the in-wheel motor drive unit case 3 is attached to the integrated unit of the two, the knuckle member for wheel steering that is configured by the upper side fixing seat 11 and the lower side fixing seat 12, as well as the in-wheel motor drive unit 2, will be configured as separate parts, so that sharing these with other vehicles becomes easy; thus, there is a cost advantage.

Embodiment 7

Figure 12:
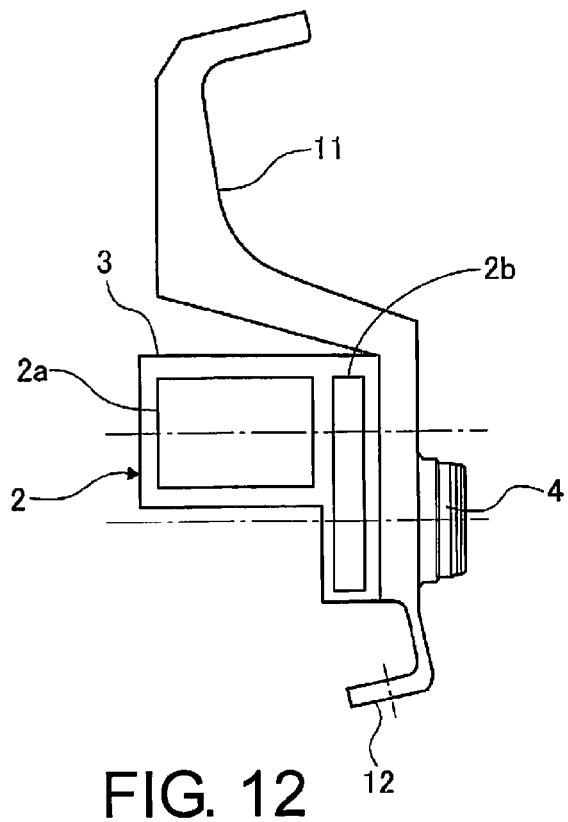
FIG. 12 is a frontal view of an in-wheel motor drive unit and the upper and lower fixing seats of a steering device of a seventh example of the present invention, as seen from the same direction as FIG. 1.

FIG. 12 is a frontal view of an in-wheel motor drive unit 2 in the steering device of the seventh example of the present invention, as seen from the same direction as FIG. 1. In the present example, while the electric motor 2a and the reduction gear (the transmission) 2b are built into the case 3 of the in-wheel motor drive unit 2, the output shaft of the reduction gear (the transmission) 2b that couples the wheel hub 4 is offset from the electric motor 2a.

Meanwhile, the configuration is the same as in the first example in that the upper side fixing seat 11 at the upper part and the lower side fixing seat 12 at the lower part of the in-wheel motor drive unit 2 are each attached to the upper arm 6 (refer to FIGS. 1 and 2) and the lower arm 7 (refer to FIGS. 1 and 2), and the in-wheel motor drive unit 2 is made to be steerable around the king pin axis Kp along with the wheel 1.

In the present example, the upper side fixing seat 11 and the lower side fixing seat 12 are integrally configured, and the case 3 of the in-wheel motor drive unit 2 is attached to the integrated upper side fixing seat 11 and the lower side fixing seat 12.

Effects

In the steering device according to the present example shown in FIG. 12, besides the effects of the first, second, and third examples, the following effect can also be exerted. That is, since the upper side fixing seat 11 and the lower side fixing seat 12 are integrally configured, and since the in-wheel motor drive unit case 3 is attached to the integrated unit of the two, the knuckle member for wheel steering that is configured by the upper side fixing seat 11 and the lower side fixing seat 12, as well as the in-wheel motor drive unit 2, will be configured as separate parts, so that sharing these with other vehicles becomes easy; thus, there is a cost advantage.

Other Embodiment

In all of the exampled described above, cases in which the wheel 1 is in-wheel motor drive wheel was described, but the aforementioned idea of the present invention can similarly be applied to drive wheels and non-drive wheels (driven wheels) whose the wheel 1 is a common wheel other than in-wheel motor drive wheels, in other words, in any type of vehicles in which a plurality of wheels are driven by a common power source; of course, the same effects as described above can also be exerted in these cases.

The invention claimed is:

1. A steering device comprising:
   an in-wheel motor drive wheel;
   a dedicated in-wheel motor drive unit including an electric motor as a power source, the dedicated in-wheel motor drive unit being integrated with the in-wheel motor drive wheel wherein the in-wheel motor drive wheel is independently driven by the dedicated in-wheel motor drive unit;
   an upper side fixing seat disposed at an upper part of the dedicated in-wheel motor drive unit for attaching an upper suspension arm to steer the in-wheel motor drive wheel about a king pin axis;
   a lower side fixing seat disposed at a lower part of the dedicated in-wheel motor drive unit for attaching a lower suspension arm to steer the in-wheel motor drive wheel about the king pin axis; and
   a steering mechanism that converts a steering force to a steering torque around the king pin axis and applies a torque to the in-wheel motor drive wheel, the steering mechanism being disposed in a location that is on the king pin axis and is above the in-wheel motor drive wheel.

2. The steering device as recited in claim 1, wherein
   the steering mechanism comprises a pinion gear that receives the steering force, and a non-constant velocity face gear that engages with the pinion gear and converts the steering force to the steering torque around the king pin axis.

3. The steering device as recited in claim 2, wherein
   the steering mechanism comprises an elastic element that biases the non-constant velocity face gear toward the pinion gear and reduces backlash.

4. The steering device as recited in claim 3, wherein
   the pinion gear has a central axis that is offset from a rotational axis of the non-constant velocity face gear.

5. The steering device as recited in claim 3, wherein
   the steering mechanism is disposed on one of the upper and lower suspension arms.

6. The steering device as recited in claim 3, further comprises
   a transmission that is utilized for driving the in-wheel motor drive wheel by transmitting rotation from the electric motor, and
   the in-wheel motor drive unit having a case that is divided in an axial direction at a location of the transmission into a first case part and a second case part, the upper side fixing seat and the lower side fixing seat each being integrally disposed on one of the first and second case parts that is closer to the in-wheel motor drive wheel.

7. The steering device as recited in claim 3, further comprises
   a transmission that is utilized for driving the wheel by transmitting the rotation from the electric motor, the electric motor having a central axis that is offset from the transmission, and
   the case of the in-wheel motor drive unit is divided in the axial direction at the location of the transmission into a first case part and a second case part, the lower side fixing seat being integrally disposed on the first case part that is closer to the in-wheel motor drive wheel, and the upper side fixing seat is integrally disposed on the second case part that is farther from the in-wheel motor drive wheel.

8. The steering device as recited in claim 3, wherein
   the king pin axis is tilted relative to a vertical line.

9. The steering device as recited in claim 2, wherein
   the pinion gear has a central axis that is offset from a rotational axis of the non-constant velocity face gear.

10. The steering device as recited in claim 9, further comprises
    a transmission that is utilized for driving the in-wheel motor drive wheel by transmitting rotation from the electric motor, and
    the in-wheel motor drive unit having a case that is divided in an axial direction at a location of the transmission into a first case part and a second case part, the upper side fixing seat and the lower side fixing seat each being integrally disposed on one of the first and second case parts that is closer to the in-wheel motor drive wheel.

11. The steering device as recited in claim 9, wherein
    the steering mechanism is disposed on one of the upper and lower suspension arms.

12. The steering device as recited in claim 9, further comprises
    a transmission that is utilized for driving the wheel by transmitting the rotation from the electric motor, the electric motor having a central axis that is offset from the transmission, and
    the case of the in-wheel motor drive unit is divided in the axial direction at the location of the transmission into a first case part and a second case part, the lower side fixing seat being integrally disposed on the first case part that is closer to the in-wheel motor drive wheel, and the upper side fixing seat is integrally disposed on the second case part that is farther from the in-wheel motor drive wheel.

13. The steering device as recited in claim 2, wherein
    the steering mechanism is disposed on one of the upper and lower suspension arms.

14. The steering device as recited in claim 2, further comprises
    a transmission that is utilized for driving the in-wheel motor drive wheel by transmitting rotation from the electric motor, and
    the in-wheel motor drive unit having a case that is divided in an axial direction at a location of the transmission into a first case part and a second case part, the upper side fixing seat and the lower side fixing seat each being integrally disposed on one of the first and second case parts that is closer to the in-wheel motor drive wheel.

15. The steering device as recited in claim 2, further comprises
    a transmission that is utilized for driving the wheel by transmitting the rotation from the electric motor, the electric motor having a central axis that is offset from the transmission, and
    the case of the in-wheel motor drive unit is divided in the axial direction at the location of the transmission into a first case part and a second case part, the lower side fixing seat being integrally disposed on the first case part that is closer to the in-wheel motor drive wheel, and the upper side fixing seat is integrally disposed on the second case part that is farther from the in-wheel motor drive wheel.

16. The steering device as recited in claim 2, wherein
    the king pin axis is tilted relative to a vertical line.

17. The steering device as recited in claim 1, wherein
    the steering mechanism is disposed on one of the upper and lower suspension arms.

18. The steering device as recited in claim 1, further comprises
- a transmission that is utilized for driving the in-wheel motor drive wheel by transmitting rotation from the electric motor, and
- the in-wheel motor drive unit having a case that is divided in an axial direction at a location of the transmission into a first case part and a second case part, the upper side fixing seat and the lower side fixing seat each being integrally disposed on one of the first and second case parts that is closer to the in-wheel motor drive wheel.

19. The steering device as recited in claim 1, further comprises
- a transmission that is utilized for driving the wheel by transmitting the rotation from the electric motor, the electric motor having a central axis that is offset from the transmission, and
- the case of the in-wheel motor drive unit is divided in the axial direction at the location of the transmission into a first case part and a second case part, the lower side fixing seat being integrally disposed on the first case part that is closer to the in-wheel motor drive wheel, and the upper side fixing seat is integrally disposed on the second case part that is farther from the in-wheel motor drive wheel.

20. The steering device as recited in claim 1, wherein the king pin axis is tilted relative to a vertical line.

* * * * *